July 20, 1965
W. A. DIPPEL
3,196,085
PROCESS FOR PURIFYING ACRYLONITRILE
Filed Feb. 12, 1962
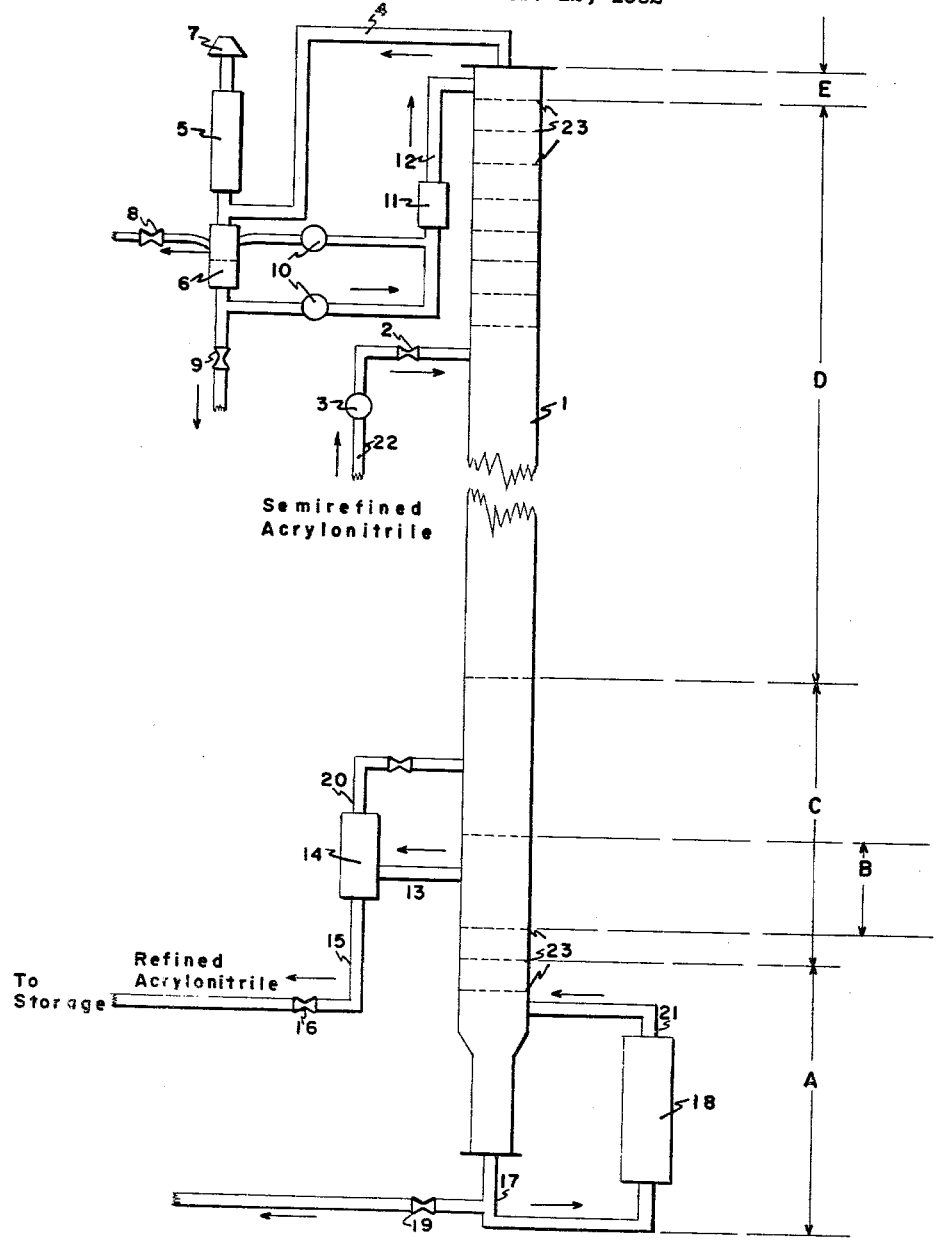
INVENTOR.
WILLIAM A. DIPPEL

United States Patent Office 3,196,085
Patented July 20, 1965

3,196,085
PROCESS FOR PURIFYING ACRYLONITRILE
William A. Dippel, Wilmington, Del., assignor to E. I. du Pont de Nemours and Company, Wilmington, Del., a corporation of Delaware
Filed Feb. 12, 1962, Ser. No. 172,703
4 Claims. (Cl. 202—42)

This invention relates to the preparation of acrylonitrile. More particularly, it relates to the refining of impure acrylonitrile by rectification.

In a process for the manufacture of acrylonitrile, the crude product obtained from the synthesis reactors is subjected to a preliminary distillation which substantially completely removes high boiling impurities and gives an overhead stream of semirefined acrylonitrile which, however, still contains variable amounts of water up to saturation at the ambient storage temperature, acetone, 1,5-hexadiene, and hydrogen cyanide, all of which are objectionable because they interfere with the subsequent use of the acrylonitrile in chemical syntheses. Also present in the semirefined acryonitrile are lesser amounts of benzene and unobjectionable trace amounts of other impurities. The presence of hydrogen cyanide seriously interferes with further purification of this semirefined acrylonitrile by known distillation procedures because part of the hydrogen cyanide goes overhead and part appears in the bottoms as a higher boiling, thermally unstable material. Attempts to obtain pure acrylonitrile by removing acrylonitrile vapors as a side stream from near the bottom of the column are ineffective because the impurities in the heated zone at the bottom of the column undergo gradual thermal decomposition with liberation of hydrogen cyanide which reappears in excessive amounts in the product stream of acrylonitrile vapor, thereby rendering the acrylonitrile unsuitable for commercial use as a chemical intermediate.

To be satisfactory for further use, the acrylonitrile must contain no more than 5 parts per million (p.p.m.) by weight of hydrogen cyanide. The concentration of other objectionable impurities in the semirefined acryonitrile also must be reduced by the refining process so that the purified acrylonitrile will meet the following specifications:

| | By weight |
|---|---|
| Acetone (maximum) | 0.03% |
| Benzene (maximum) | 0.05% |
| Hexadiene-1,5 (maximum) | 0.01% |
| Hydrogen cyanide (maximum) | 5 p.p.m. |
| Water (maximum) | 0.45% |
| Acryonitrile (minimum) | 99.5% |

The removal of acetone, hexadiene-1,5 (a relatively low boiling impurity), water, and benzene can be accomplished readily by the known processes of fractionation, azeotropic distillation, water-extractive distillation, and combinations of them. Exactly why the presence of hydrogen cyanide makes so difficult the purification of the semirefined acrylonitrile to give a product of specification grade is not fully understood. Since hydrogen cyanide can form polymeric materials and rearrangement products thereof and also can react with other components of the semirefined acrylonitrile, such as the reaction of hydrogen cyanide with acetone, in both instances resulting in higher boiling, non-azeotroping, but thermally unstable products, it is believed that such conversion products may be responsible for the difficulties which have been experienced in purifying the semirefined acrylonitrile. However, there is no intent or desire to limit the present invention by any theory of the cause of the difficulty which has been overcome by virtue of the present invention.

Whatever the source, however, the present invention provides a means of overcoming the problem of purifying semirefined acrylonitrile of the kind described above. The following invention is concerned with a refining process which produces acrylonitrile which conforms to the requirements for pure acrylonitrile given above and which is suitable for use as a chemical intermediate and particularly for use in the manufacture of polymeric materials for synthetic fibers, elastomers, and the like.

In accordance with the present invention, an improved process for purifying acryonitrile is provided which comprises continuously passing semirefined acrylonitrile into a water-bearing zone within a fractionating column, continuously removing from an upper zone within said column and above said water-bearing zone hydrogen cyanide, acrylonitrile-water azeotrope, and other components boiling at a temperature lower than acrylonitrile, continuously adding to said water-bearing zone a quantity of water equal to that removed from said upper zone, continuously removing purified acrylonitrile in vapor form from a lower zone within said column and below said water-bearing zone, and continuously heating a liquid column bottom containing acrylonitrile and components having a boiling temperature higher than acrylonitrile to provide acrylonitrile vapors, said vapors passing upward through the respective zones in said column in heat-exchange relationship with downcoming liquids.

Water is prevented from entering lower zones of the column by the boilup of acrylonitrile from lower zones of the column to form acrylonitrile azeotropes which continually move water up and eventually out of the column. The removal of water as azeotropes is compensated for by feeding water contained in the semirefined acrylonitrile and that added as reflux to said upper zone of the column. The water-bearing zone in substantial depth thereby is stabilized and acts essentially as a barrier to the passage of hydrogen cyanide and its combinations into the lower zones of the column where the hydrogen cyanide can contaminate the refined acrylonitrile.

In order to describe my invention more fully, reference is made to the drawing which depicts, in simplified form, an illustrative arrangement of equipment for carrying out the process of the present invention. For simplicity, obvious details such as storage tanks, pumps, meters, instrumentation, and the like generally have been omitted.

The drawing depicts a fractionating column 1, approximately 4 inches in diameter, having sixty plates 23, a reboiler 18 connected to the base of the column, a product condenser 14, and a vapor take-off line 13 connected to the column above the liquid level of the third plate, a feed line supplying semirefined acrylonitrile through valve 2 to the fractionating column above the fifty-second plate, a condenser 5 connected to the top of the column through overhead vapor line 4 and discharging to a decanter 6, from which upper and lower layers of condensate may be either withdrawn through outlets 8 and 9, respectively, or returned as reflux by pumps 10 through preheater 11 and line 12 to column 1 at a location above the upper plate. A jacket, heating coils, and related temperature controllers for the fractionating column (not shown) facilitate its operation under substantially adiabatic conditions.

Operation of the column 1 is carried out substantially at atmospheric pressure, incrementally modified throughout the column by pressure drops through the plates 23 totaling 75 to 150 inches of water. The rates of boilup, of reflux, and of feed of semirefined acrylonitrile are balanced so that under steady state operating conditions the temperature profile throughout the length of a column of the type illustrated will approximate the following pattern:

| | °C. |
|---|---|
| Top of column | 69 |
| Plate 50 | 72 |
| Plate 40 | 74 |
| Plate 33 | 74 |
| Plate 20 | 77 |
| Plate 14 | 77 |
| Plate 10 | 83 |
| Plate 6 | 86 |
| Base of column | 86 |

The several functioning zones of the fractionating column are further designated in the drawing by letters which are more particularly identified as follows:

A—Heat input zone
B—Product take-off zone
C—Dry fractionation zone
D—Water-bearing zone
E—Reflux-return zone The interrelationship of these zones and the operation of the process represented by the drawing are as follows:

Semirefined acrylonitrile containing more than 5 p.p.m. of HCN and substantially saturated with water at ambient storage temperature is fed to zone D of fractionating column 1 through valve 2 by pump 3 on line 22. In order to maintain a relatively steady state in the fractionating column 1, the semirefined acrylonitrile is preheated to a temperature of about 70–72° C. which corresponds with that of the contents of the column at the feed point. Low boiling impurities such as hydrogen cyanide, acetone, and hexadiene-1,5 together with azeotropes containing benzene, acrylonitrile, and water pass upward through the column and out line 4 to condenser 5. Uncondensed material is discharged through vent 7, while condensate passes to decanter 6 where it separates into a hydrocarbon- and acrylonitrile-rich upper layer and an aqueous lower layer which also contains dissolved acrylonitrile. Purges of the two layers may be taken through valves 8 and 9, respectively. Substantial portions of both layers are returned as reflux to zone E of the fractionating column by way of proportioning pumps 10, reflux preheater 11 and line 12. Alternatively, fresh water may be supplied as reflux to zone E, partially or completely replacing the water-rich lower layer from decanter 6. Acrylonitrile and higher boiling materials pass down the column into relatively short zone C which facilitates separation of acrylonitrile from small amounts of high boiling materials. Purified acrylonitrile vapor containing less than 5 p.p.m. of hydrogen cyanide leaves column 1 at zone B through vapor line 13 and condenser 14, to which also is connected pressure-equalizing line 20. Liquid acrylonitrile of specification quality is withdrawn to finish product storage through line 15 and valve 16. Liquid acrylonitrile containing high boiling materials enters zone A of the column wherein the acrylonitrile is revaporized after passing through line 17 to reboiler 18, and back to the column through line 21. This revaporization supplies heat to the column to support the fractionization. When necessary, a purge of column bottoms in zone A may be taken through valve 19.

In the operation of column 1, acrylonitrile serves as a carrier for water in the form of a lower boiling relatively water-rich azeotrope which after condensation and collection in decanter 6 separates into a relatively water-poor upper layer of acrylonitrile, most of which is returned to the column as reflux and a lower layer, most of which is water. Over-all, then, water and semirefined acrylonitrile entering the column together through valve 2 leave the refining operation through valve 9 (water) and valve 16 (acrylonitrile). The purges from the refining column may be reworked through earlier stages of the acrylonitrile plant operation so that nearly all of the acrylonitrile in the semi-refined feed eventually is recovered as high-quality acrylonitrile conforming to the requirements of the product specification.

In carrying out the process of this invention, control of the length of the water-bearing zone in the column is important and is achieved easily by observing the temperature difference of the column contents substantially at the region of plates 10 to 14 overlapping zones C and D. Approximately a 6° C. temperature difference will prevail. If the level at which the wide temperature break occurs moves upward in the column, the rate of return of reflux water through line 12 is increased until the temperature break returns to the desired level in the column. If the zone of the temperature break moves downward in the column, the water reflux rate is retarded so that the temperature-break zone again moves upward to its proper position in the fractionating column.

Whatever the specific design of the fractionating column used in the practice of this invention, functioning zones A to E must be incorporated therein, and the bottom of water-bearing zone D will be characterized by a marked temperature break, as described above. The presence of water-bearing zone D is critical to the operation of this invention because water is required for the liberation and subsequent disengagement of HCN from the semirefined acrylonitrile. Further, the water bearing zone D must be held in the upper portion of the column so that water vapors do not contaminate the refined acrylonitrile vapors which are drawn off through line 13.

The process of this invention as described above has sufficient flexibility for use in purifying semirefined acrylonitrile of an appreciable range of compositions. The presence of hexadine-1,5, benzene, and acetone are not essential to the operation of the process, and their removal can be accomplished by methods already known too those skilled in distillation practice. Nevertheless, these components of the semirefined acrylonitrile are included in the examples below because they usually are present in the semirefined acrylonitrile which is purified by the process of this invention. The intrinsic difficulty in purifying said semirefined acrylonitrile is associated with the presence of hydrogen cyanide and the complexes which it forms.

The use of the present invention to produce from acrylonitrile relatively rich in HCN refined acrylonitrile containing less than 5 p.p.m of HCN is illustrated in Table I below as described in Example 1, Example 2, and Example 3 which show data obtained during different periods of operation of this process.

TABLE I

| | Example 1 | | Example 2 | | Example 3 | | Refined Acrylonitrile Product Specifications |
|---|---|---|---|---|---|---|---|
| | Feed | Product | Feed | Product | Feed | Product | |
| Acetone, percent | 0.1 | 0.027 | 0.4 | 0.01 | 0.06–0.12 | 0.001–0.03 | 0.03% by weight (max.). |
| Benzene, percent | 0.1 | 0.02 | 0.2 | nil | 0.02–0.06 | nil | 0.05% by weight (max.). |
| Hexadiene-1,5, percent | 0.03 | nil | | | 0.1–0.34 | 0.01 | 0.01% by weight (max.). |
| Hydrogen cyanide, p.p.m | 5,000 | 4.8 | ca. 2,000 | 1.9 | 50–250 | 0.3–3.9 | 5 p.p.m. by weight (max.). |
| Water, percent | 3.5 | 0.05 | 0.4 | 0.07 | | 0.19–0.30 | 0.45% by weight (max.). |
| Acrylonitrile, percent | 95.7 | 99.9 | ca. 99 | 99.9 | | 99.9 | 99.5% by weight (min.). |

Example 1

Semirefined acrylonitrile having the composition shown in Table I under the heading "Feed" was processed through the 4-inch diameter fractionating column operated in the manner described above. The refined acrylonitrile removed through valve 16 contained less than 5.0 p.p.m. of HCN and otherwise also conformed with the finished product specifications.

Example 2

Semirefined acrylonitrile having the composition under the heading "Feed" in Table I was processed as described above. The refined acrylonitrile contained only 1.9 p.p.m. of hydrogen cyanide and otherwise conformed with the finished product specifications.

Example 3

For this example, several lots of semirefined acrylonitrile having compositions within the ranges indicated under the heading "Feed" in Table I were processed successively in an extended period of operation of the fractional distillation equipment in the manner described above. The composition of the several lots of refined acrylonitrile all fell within the ranges of composition shown under the heading "Product." The hydrogen cyanide content of each of the lots of refined acrylonitrile was well below the specification limit of 5 p.p.m., and other finished product specifications also were satisfied.

Example 4

To illustrate further the manner in which the constituents of the semirefined acrylonitrile are redistributed by the process of this invention, attention is directed to Table II below which shows, respectively, the composition of a 10,000-pound lot of semirefined acrylonitrile feed and the compositions of the streams which come from the continuously operating column through the various exit lines shown in FIGURE 1.

reflux stream. Since the stabilizer is a soluble material of relatively low volatility, it will accumulate at the bottom of the column and can be removed from the system through valve 19. The amount of purge from the bottom of the column will be increased if the impure feed to the column contains larger percentages of high boiling impurities than have been indicated in the examples.

Stabilizer likewise may be added to the refined acrylonitrile which is removed from the system through valve 16. Also, the operation of the column may be controlled so as to provide a water content of the refined acrylonitrile at any desired level.

The specific design of the fractionating column is not critical to the operation of the process of this invention so long as the column provides the essential functioning features described above and in the drawing. Internally the column may contain bubble plates, sieve plates, or a suitable packing. The height and diameter of the column will be related to the efficiency of the column and the desired throughput.

Although the rectification may be accomplished at other pressures, operation of the process at substantially atmospheric pressure is effective and is preferred.

Various modifications of the invention as described above may be apparent to those skilled in the art. Hence, it will be understood that the invention is not limited to the foregoing description except as the invention is defined in the appended claims.

What is claimed is:

1. An improved process for purifying acrylonitrile which comprises continuously feeding semirefined acrylonitrile containing hydrogen cyanide into a first zone within a fractionating column, water in the upper part of said first zone being maintained at a higher concentration than that in the feed; continuously adding water to said first zone; continuously removing from an upper zone within said column and above said first zone, hydrogen cyanide, acrylonitrile-water azeotrope, and other components

TABLE II

| | Semirefined Feed [2] | | Aqueous Purge (Pounds) [3] | "Oil" Purge (Pounds) [4] | Refined Acrylonitrile Product [5] | |
|---|---|---|---|---|---|---|
| | Pounds | Percent | | | Pounds | Percent |
| Acetone | 15 | 0.15 | 10 | 3 | 2 | 0.02 |
| Hexadiene-1,5 | 20 | 0.05 | | 20 | | nil |
| Benzene | 5 | 0.20 | | 4 | 1 | 0.01 |
| HCN | 2 | {2,030 p.p.m. 0.02 | 1 | 1 | | {<5 p.p.m. "nil" |
| Water | 370 | 3.7 | 341 | 1 | 28 | 0.29 |
| Other [1] | 2 | 0.02 | | | 1 2 | 0.02 |
| Acrylonitrile | 9,586 | 95.86 | 38 | 4 | 9,544 | 99.66 |

[1] Unobjectionable amounts of minor impurities.
[2] Enters column through valve 2, in the attached drawing.
[3] Removed from column through valve 9, in the attached drawing.
[4] Removed from column through valve 8, in the attached drawing.
[5] Removed from column through valve 16, in the attached drawing.

Note that the hydrogen cyanide concentration is reduced to specification levels in the refined product, and the HCN so removed is distributed about equally between the aqueous and the "oil" purge streams.

The amount of feed material purged from the bottom of the column (through valve 19 in the drawing) is almost negligible. As is common practice in the operation of acrylonitrile refining columns, a stabilizer usually is included with the semirefined feed in a concentration of 1 to 2000 p.p.m. The stabilizer may be chosen from those known in the art such as p-nitrosodimethyl aniline, monomethyl ether of hydroquinone, cyclotetrathiotetraimine, metal salts of N,N-dialkyldithiocarbamic acid, α-naphthylamine, 2,2'-methylene-bis-4-ethyl-6-t-butylphenol, mixtures of acetaldehyde and dialkyl or trialkyl-amines, tetra alkyl thiuram monosulfides, alkyl ammonium salts of mono- or dialkyl esters of phosphoric acid, etc. Most of the acrylonitrile entering decanter 6 is returned to the column as reflux through line 12. Stabilizer in similar concentrations may be added to this boiling at a temperature lower than said acrylonitrile-water azeotrope; continuously refluxing water and acrylonitrile, the total water fed to said column including said refluxed water being equal to that withdrawn from said upper zone; continuously removing substantially anhydrous purified acrylonitrile in vapor form from a lower zone within said column and below said first zone; continuously heating a liquid column bottom containing acrylonitrile and components having a boiling temperature higher than acrylonitrile in a bottom zone below said lower zone to provide acrylonitrile vapors, said vapors passing upward through the respective zones in said column in heat-exchange relationship with downcoming liquids; and removing from said bottom zone said components boiling higher than acrylonitrile which accumulate therein.

2. An improved process for purifying acrylonitrile which comprises continuously feeding semirefined acrylonitrile containing hydrogen cyanide and water into a first zone within a fractionating column, water in the upper part of said first zone being maintained at a higher concentration than that in the feed; continuously removing from an upper zone within said column and above said first zone, hydrogen cyanide, acrylonitrile-water azeotrope, and other components boiling at a temperature lower than said acrylonitrile-water azeotrope; continuously condensing product removed from said upper zone and allowing the liquified portions thereof to separate into a water-rich layer and an acrylonitrile-rich layer; continuously refluxing water and acrylonitrile from said layers, the total of said refluxed water and said water in said feed being equal to that withdrawn from said upper zone, continuously removing purified acrylonitrile in vapor form containing less than about 0.45% water from a lower zone within said column below said first zone; continuously heating a liquid column bottom containing acrylonitrile and components having a boiling temperature higher than acrylonitrile in a bottom zone below said lower zone to provide acrylonitrile vapors, said vapors passing upward through the respective zones in said column in heat-exchange relationship with downcoming liquids; and removing from said bottom zone said components boiling higher than acrylonitrile which accumulate therein.

3. A process of claim 2 wherein said semirefined acrylonitrile is saturated with water.

4. A process of claim 2 wherein stabilizer is added to the acrylonitrile being purified.

References Cited by the Examiner

UNITED STATES PATENTS

| | | |
|---|---|---|
| 2,672,434 | 3/54 | MacFarlane. |
| 2,672,435 | 3/54 | Shoptaw _____ 202—40 |
| 2,681,306 | 6/54 | Kemp et al. _____ 202—39.5 |
| 2,719,169 | 9/55 | DeCroes et al. |
| 2,726,258 | 12/55 | Stehman. |
| 2,803,588 | 8/57 | Gerstner et al. _____ 202—40 X |
| 2,807,573 | 9/57 | Robertson. |
| 3,073,753 | 1/63 | Hadley et al. |
| 3,080,301 | 3/63 | Fontana et al. |

NORMAN YUDKOFF, *Primary Examiner.*